Dec. 9, 1958     S. H. NORTON     2,863,428
VALVE ROTATING DEVICE
Filed July 13, 1955     2 Sheets-Sheet 2
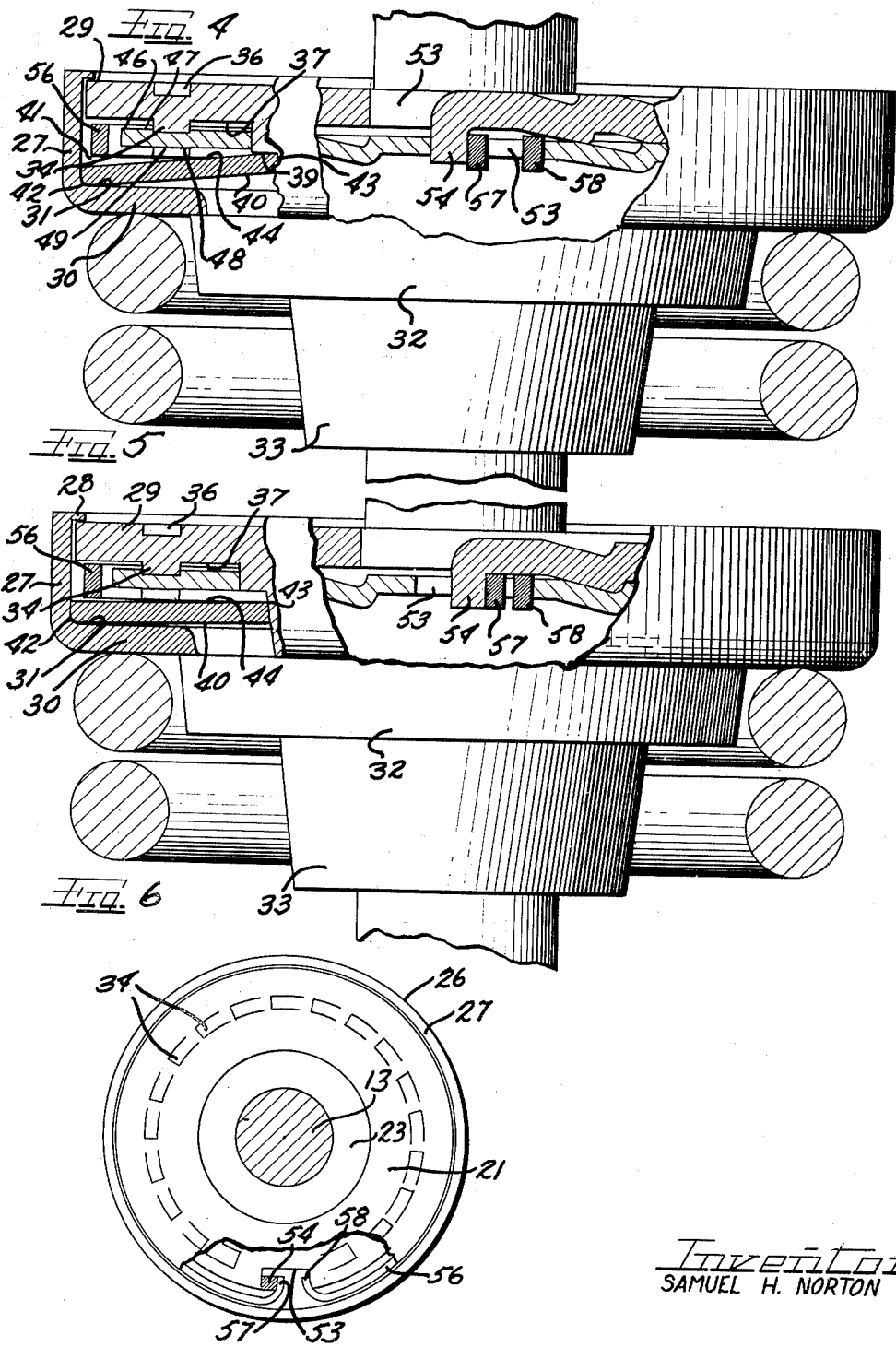
Inventor
SAMUEL H. NORTON

United States Patent Office 2,863,428
Patented Dec. 9, 1958

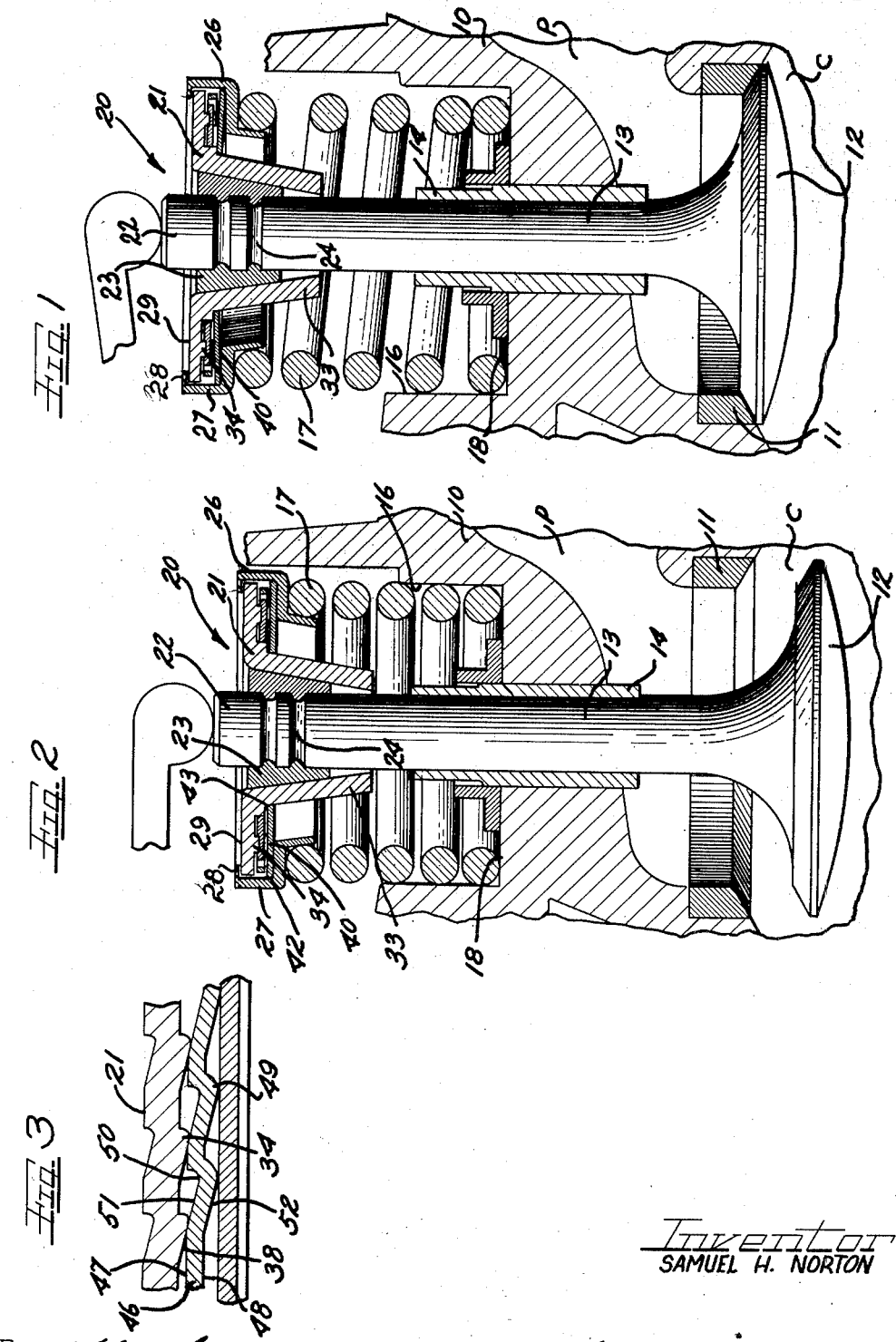

2,863,428

VALVE ROTATING DEVICE

Samuel Harry Norton, University Heights, Ohio, assignor to Thompson Products, Inc., Cleveland, Ohio, a corporation of Ohio Application July 13, 1955, Serial No. 521,763

9 Claims. (Cl. 123—90)

This invention relates generally to valve rotators and more particularly relates to a self-contained valve rotating device for automatically rotating a poppet valve as a function of the cyclic operation thereof.

Internal combustion engines are usually equipped with poppet valves and it has been found that the use of valve rotating devices to rotate the valves during engine operation causes the valves to continually seat in different angular relationship with respect to the cylinder head, thereby evening out any tendency toward carbon deposits and wear associated with particularly severe conditions at any portion of the valve or seat. Rotation of a valve during engine operation is also desirable since the valve does not acquire a recurrent bending force in the same direction when a deposit occurs at a particular point on the valve seat. Accordingly, with the use of valve rotating devices, the valves operate in an efficient manner for a longer period of time and with greater efficiency than is otherwise possible.

In accordance with the principles of the present invention, inner and outer relatively rotatable valve parts are provided and ratchet means are interposed therebetween to engage the parts and to effect incremental relative rotation.

More specifically, it is contemplated, according to the principles of the present invention, to provide a valve spring cap and a complementary shaped enclosure member which is adapted to seat a valve spring, these two components forming inner and outer relatively rotatable valve parts, respectively.

An annular spring washer having its inner annular peripheral edge engaging the spring cap and its outer annular peripheral edge engaging the closure member transfers normal valve spring loading between the valve parts.

Interposed between the parts is a disk member. The disk member is particularly characterized by the formation therein of an annular row of ratchet teeth. Moreover, the spring cap is also characterized by the formation therein of an annular row of ratchet teeth meshing with the ratchet teeth in the disk member.

A notch formed in the disk member receives a pawl or lug integral with the cap member, thereby to prescribe the limits of relative angular displacement therebetween. A circular C-shaped spring surrounds the disk member and has offset end portions received in the notch to engage against the pawl or lug of the cap member and against one edge of the notch of the disk member. There is thus exerted a continuous biasing force which keeps the ratchet teeth in operative relationship.

The ratchet teeth on the disk member also engage a medial portion of the spring washer. The ratchet teeth, in effect, present operatively confronting inclined surfaces. Thus, when an increased axial load is applied to the valve assembly, for example, when the valve is opened, the spring washer will be pivotally deflected to move the inner peripheral edge of the spring washer away from the valve spring cap. Thereupon, increased pressure will be exerted between the tapered or inclined surfaces of the ratchet teeth. A relative sliding motion will occur between the ratchet teeth and the two rotatable parts will be driven with a relative rotary motion. This relative turning will continue until the spring washer resumes its conical shape and again contacts the valve cap member at the inner edge of the washer. When the disk member and the cap member are operatively separated, the spring will rotate the parts to restore the ratchet teeth to an operative position. By virtue of such arrangement, the valve will be turned incrementally each time the valve is lifted off its seat.

It is an object of the present invention, therefore, to provide an improved valve rotating device.

It is another object of the present invention to provide a positive means of rotating engine valves which comprises a reduced number of simplified components which are convenient to make and economical to manufacture.

Another object of the present invention is to provide valve rotating device wherein all the components exhibit great durability.

Yet another object of the present invention is to provide a valve rotating device utilizing ratchet means for effecting incremental rotation of two adjacent valve parts.

Many other features, advantages and additional objects of the present invention will become manifest to those versed in the art upon making reference to the detailed description which follows and the accompanying sheets of drawings in which a preferred structural embodiment of a valve rotating device incorporating the principles of the present invention is shown by way of illustrative example.

On the drawings:

Figure 1 is a vertical cross-sectional view with parts shown in elevation of a poppet valve assembly equipped with a valve rotating device according to the principles of the present invention and showing the valve in closed position;

Figure 2 is a view similar to Figure 1 but illustrating the parts of the valve in open position;

Figure 3 is a fragmentary view illustrating a cross-sectional development of the ratchet surfaces produced in accordance with the principles of the present invention;

Figure 4 is an enlarged fragmentary view of the valve rotating device with parts broken away and with parts shown in cross section to illustrate additional details of construction, the view corresponding generally to the view of Figure 1;

Figure 5 is a view similar to Figure 4 but showing the parts of the valve rotating device when the valve is in open position as in Figure 2; and Figure 6 is a plan view, smaller in scale than the views of Figures 4 and 5, of the valve rotating device with parts broken away and with parts shown in cross section to illustrate additional details of construction.

As shown on the drawings:

In Figures 1 and 2 the reference numeral 10 indicates an engine part such as a portion of a cylinder head having a combustion chamber C and a port P, for example, an exhaust port. A seat ring 11 is secured in the mouth of the port P and has a beveled seating face facing the combustion chamber C for engaging the correspondingly beveled seating face on a valve head 12 carried on one end of a valve stem 13 and provided to control the port P.

The stem 13 is slidably mounted in a stem guide 14 carried by the engine part 10 and extends into a recess 16 formed in the engine part 10.

A coil type valve spring 17 has one end bottomed on a wall 18 at the bottom of the recess 16 and the opposite end of the valve spring 17 engages the valve rotating device of the present invention which is indicated generally by the reference numeral 20 and which is operatively connected to the valve stem 13 in order to rotate the valve in accordance with the cyclic operation thereof.

In the preferred embodiment herein illustrated by way of illustrative example, the valve rotating device 20 is located between the upper end of the valve spring 17 and the tip of the valve stem 13, thereby to facilitate the advantageous exploitation of the conventional valve spring cap which is usually provided near the tip end of a valve stem; however, it will be understood that the features of the present invention are applicable to any valve rotating device effectively interposed between a relatively stationary engine part and a relatively rotatable valve, either when installed at the tip end of the valve as shown in Figures 1 and 2 or at the base of the valve spring 17 in the recess 16.

Referring to Figures 3 and 6 in conjunction with Figures 1 and 2, the valve rotating device 20 comprises inner and outer relatively rotatable valve parts which conveniently comprise a valve spring cap indicated at 21 connected to the tip end 22 of the valve stem 13 by means of a tapered lock 23 engaging one or more annular grooves 24 to anchor the valve spring cap in firm assembly with the valve stem 13. Thus, the valve spring cap could be considered as the inner relatively rotatable part of the valve rotating device 20 according to the principles of the present invention.

The outer part of the valve rotating device 20 comprises a housing member 26 of a generally ring shaped annular configuration. The housing 26 includes an axially extending flat wall 27 having radially inwardly extending portions 28 (Figures 4 and 5) at the upper end thereof to engage a radially extending flat surface 29 provided by the valve spring cap 21.

At the bottom of the wall 27 is provided a radially inwardly extending wall 30 which provides a flat wall surface 31. At the radial inner portions of the wall 30 is provided an axially extending flange 32 which conveniently comprises a pilot portion for entering the convolutions of the coil type valve spring 17. As is illustrated in the drawings, the end of the valve spring 17 engages and bottoms against the seat provided by the flange 32 and the wall 30 of the housing 26.

In regard to the structural details of the valve spring cap 21, a generally axially extending portion 33 is provided and is tapered to conform to the taper of the lock 23. The valve spring cap 21 is particularly characterized, according to the principles of the present invention, by the formation therein of a plurality of ratchet teeth 34. The ratchet teeth 34 are conveniently provided by embossing the surface 29 of the valve cap member so that a plurality of recesses 36 will appear in the surface 29 directly opposite the ratchet teeth 34 which will extend and protrude from the bottom surface 37 of the flanged portion on the cap member 21.

As is best shown in the development of Figure 3, the ratchet teeth 34 are not only circumferentially spaced with respect to one another but form inclined action surfaces 38 which are tapered in the relative direction of rotation between the inner and outer rotatable parts.

Interposed between the inner and outer parts is a spring washer 40 having an outer peripheral edge 42 seating and engaging against the surface 31 of the housing 26. The spring washer 40 is further provided with an inner peripheral edge indicated at 43 seating and engaging against a radial wall 39 formed on and provided by the valve cap member 21. A suitable form of spring washer 40 is commercially available under the identification "Belleville" spring washer.

Because of the axial offset of the inner edge 43 and the outer edge 42 of the spring washer 40, a tapered surface 44 is provided on the spring washer 40 and forms the floor of recess 41 between the housing member 26 and the valve cap member 21.

The present invention further contemplates the provision of a disk member 46 interposed between the spring washer 40 and the flange of the valve cap member 21. The disk member is of a generally ring shape annular configuration, being flat in form and having upper and lower surfaces indicated at 47 and 48, respectively. The disk member 46 is particularly characterized by the formation therein of an annular row of ratchet teeth 49 corresponding generally in number and in circumferential spacing to the ratchet teeth 34. Furthermore, the ratchet teeth 49 are arranged to lie in concentric register with the ratchet teeth 34. There is, thus, formed on the disk member 46 a plurality of recesses 50 on the upper surface 47, each recess 50 having an inclined action surface 51, and a corresponding plurality of ratchet teeth 49 extending and protruding out of the lower surface 48; each ratchet tooth 49 having a tapered surface indicated at 52.

The ratchet teeth 34 mesh with the ratchet teeth 49 or, more specifically according to the reference numerals applied in the description hereof, the ratchet teeth 34 and the valve cap member 21 are received in the corresponding recesses 50 of the disk member 46 so that the action surfaces 38 and 51 operatively confront and slidably engage one another.

The disk member is also provided at its periphery with an elongated notch 53. Received within the notch 53 is a pawl or lug 54 struck downwardly from the flange of the valve cap member 21. As will be noted in the drawings, the pawl or lug 54 is considerably narrower in width than the width of the elongated notch 53. Thus, although the two parts are relatively rotatable, the engagement of the pawl or lug 54 with the edges of the notch 53 prescribe the limitations of relative angular displacement between the two parts.

In order to keep the ratchet teeth 34 and 49 in operative relation, with the relative action surfaces 38 and 51 relatively separated, a continuous biasing means is operatively interposed between the two parts. In the form of the invention herein illustrated, a circular C-shaped spring 56 is provided having opposite ends 57 and 58 received in the notch 53. The end 57 of the spring 56 engages against the pawl or lug 54 and the end 58 of the spring 56 engages against the opposite edge portion of the notch 53.

It will be manifest to those versed in the art that if pressure is applied to the valve cap 21 and the disk member 46 tending to press the two parts together, relative rotation therebetween will occur because of the sliding motion between the ratchet teeth 34 and 49.

In the assembly of the valve rotating device, the ratchet teeth 49 extending from the surface 48 engage the tapered surface 44 of the spring washer 40. Thus, normal spring loads are transmitted between the inner and outer parts by the spring washer. However, any pressure applied upwardly to the collar or housing 26 and downwardly on the valve spring cap 21, such as an increased spring load occurring upon opening of the valve, will tend to compress the spring washer 40 and cause the surface 44 to flatten and pivot around its outer periphery at the outer edge 42 due to the pressure of the projecting ratchet teeth 49 exerted against the mid-surface of the spring washer 40. This pivoting action of the spring washer 40 forces the inner periphery 43 away from the shoulder 39 on the valve cap member 21.

As long as the cap member 21 is pressing and engaging against the inner peripheral edge 43 of the spring washer 40, the cap member 21 is, in effect, locked against relative turning. When such contact is broken, however, by a flattening of the spring washer 40, the cap member 21 is free to turn and will turn because the ratchet teeth 34 will slide down the ratchet teeth 49 or, more specifically, the action surface 38 on the valve cap member 21 will slide on the action surface 51 of the disk member 46, thereby producing relative rotary motion between the two parts.

This relative turning will continue until the spring washer 40 resumes its generally conical shape and the inner peripheral edge 43 again re-engages the valve cap member 21. When the spring washer 40 again resumes its normal conical shape, the auxiliary ratchet member or disk member 46 will be, in effect, operatively separated from the valve cap member 21, whereupon the continuous biasing means or spring member 56 will rotate the disk member 46 with respect to the valve cap member 21 until the ratchet teeth 34 and 49 are again re-aligned in operative position. A combination of these actions will result in an incremental rotation of the valve each time the valve is operated.

Although various minor structural modifications might be suggested by those versed in the art, it should be understood that I do not wish to be limited to the preferred structural embodiment herein described by way of illustrative example only but wish to embody within the scope of the patent warranted hereon all such modifications as reasonably and properly come within the scope of my contribution to the art.

I claim as my invention:

1. A valve rotating device comprising inner and outer relatively rotatable parts, deformable resilient means connecting said parts, and ratchet means interposed between and engaging said resilient means and one of said parts having circumferentially overlapped axially inclined opposed ratchet surfaces to effect relative rotation between the parts upon deformation of said resilient means.

2. A device for effecting relative rotation between two parts subjected to changing loads which comprises, adjacent relatively rotatable parts and a deformable resilient member and shiftable ratchet elements connecting said parts including a disk shaped to provide an annular row of ratchet teeth, one of said parts having ratchet teeth formed to provide operatively confronting tapered surfaces inclined in the direction of rotation, said disk engaging said resilient member to effect rotative movement of one of the parts relative to the other part upon on increase of load therebetween of amount sufficient to deform said resilient member.

3. A device for effecting relative rotation between inner and outer relatively rotatable parts in response to increased loads which comprises inner and outer relatively rotatable parts, a resilient member connecting said parts, and shiftable ratchet means comprising a disk having an annular row of ratchet teeth formed therein engaging said resilient member at one side of said disk and one of said parts on the other side of said disk, said one of said parts having oppositely confronting surface portions inclined to mesh with said ratchet teeth and to rotatably drive the parts upon relative sliding movement therebetween whenever the resilient member is deflected to transmit increased load to said inclined surface portions.

4. A device for effecting relative rotation between inner and outer relatively rotatable parts in response to increased loads which comprises inner and outer relatively rotatable parts, a resilient member connecting said parts, and shiftable ratchet means comprising a disk having an annular row of ratchet teeth extending through opposite axially spaced faces thereof engaging said resilient member and one of said parts having an annular row of ratchet teeth formed therein presenting oppositely confronting surface portions meshing with the teeth in said disk and inclined to rotatably drive the parts upon relative sliding movement therebetween whenever the resilient member is deflected to transmit increased load to said inclined surface portions and means for restoring said inclined surface portions to operative position.

5. A rotating device comprising inner and outer parts relatively rotatable around a prescribed axis, a deflectable member between said parts for transmitting variable axially directed loads therebetween, and shiftable members between one of said parts and said deflectable member comprising axially spaced radially extending disk surfaces having struck portions extending axially of said surfaces and forming an annular row of meshing ratchet portions having oppositely confronting inclined surface portions, said surface portions being slidable in response to increased axial load upon deflection of said deflectable member, and a spring between said shiftable members to maintain said surface portions in an operative position.

6. A valve rotating device comprising outer and inner relatively rotatable parts adapted to be connected to an engine part and a valve member, respectively, and having an annular recess formed between said parts, an annular resilient washer in said recess connecting said parts, and means in said recess engaging said washer and one of said parts comprising a valve cap having an annular row of ratchet teeth struck therefrom and a disk shaped to provide a corresponding annular row of ratchet teeth meshing with the teeth on said cap and together providing a plurality of ratchet surfaces inclined to rotatably drive said parts upon deflection of said washer in response to increased axial load and a circumferentially extending spring operatively connected to said cap and disk to retain said ratchet surfaces in operative position.

7. In a valve rotating device, a valve spring cap and a complementary shaped enclosure member adapted to seat a valve spring and forming inner and outer relatively rotatable valve parts, respectively, an annular spring washer having its inner annular peripheral edge engaging said spring cap and its outer annular peripheral edge engaging said enclosure member to transfer normal valve spring loading between the valve parts, said cap having ratchet teeth formed thereon extending into said enclosure, a disk member in said enclosure engaging said spring washer and having ratchet teeth formed thereon meshing with said ratchet teeth in said valve cap, said disk member having a notch formed therein, said cap having a lug received in said notch to limit relative rotational displacement therebetween, and a circular C-shaped spring having offset end portions received in said notch engaging against said lug and against said disk member, respectively, to keep the ratchet teeth in operative position, said ratchet teeth in said disk member engaging said washer, whereupon increased axial load will tend to compress said spring washer and pivot same thereby to move its inner periphery away from said valve cap, said cap thereupon being free and turning in response to relative sliding action between said ratchet teeth.

8. In a valve rotating device, a valve spring cap and a complementary shaped enclosure member adapted to seat a valve spring and forming inner and outer relatively rotatable valve parts, respectively, an annular spring washer having its inner annular peripheral edge engaging said spring cap and its outer annular peripheral edge engaging said enclosure member to transfer normal valve spring loading between the valve parts, a disk member between said washer and said valve spring cap, said disk member having ratchet teeth engaging said washer intermediate its inner and outer peripheral edges, said valve spring cap having ratchet teeth meshing with said ratchet teeth of said disk member, said washer being pivoted in response to increased load between said parts to move the inner peripheral edge of said spring washer away from said spring cap and exerting pressure against said ratchet teeth to incrementally rotate said valve spring cap until said inner peripheral edge of said washer again engages said valve spring cap upon sliding of said ratchet teeth to a different position, and a circumferentially extending spring connected to said disk member and said valve spring cap operating to rotate said disk member back to its original position whenever the load between said parts is decreased.

9. In a valve rotating device, a valve spring cap and a complementary shaped enclosure member adapted to seat a valve spring and forming inner and outer relatively rotatable valve parts, respectively, an annular spring washer having its inner annular peripheral edge engaging said spring cap and its outer annular peripheral edge engaging said enclosure member to transfer normal valve spring loading between the valve parts, a disk member between said washer and said valve spring cap, said disk member having ratchet teeth engaging said washer intermediate its inner and outer peripheral edges, said valve spring cap having ratchet teeth meshing with said ratchet teeth of said disk member, said washer being pivoted in response to increased load between said parts to move the inner peripheral edge of said spring washer away from said valve spring cap and exerting rotational pressure against said disk member to incrementally rotate said valve spring cap until said inner peripheral edge of said washer again engages said valve spring cap after full meshing of said ratchet teeth, and means operatively engaged with said disk member and said valve spring cap to circumferentially position said disk member between the parts.

References Cited in the file of this patent

UNITED STATES PATENTS

| | | |
|---|---|---|
| 1,359,669 | Buck | Nov. 23, 1920 |
| 1,479,169 | Buck | Jan. 1, 1924 |
| 2,516,795 | Norton | July 25, 1950 |
| 2,767,696 | Engemann | Oct. 23, 1956 |